US011048549B2

(12) United States Patent
Phoenix et al.

(10) Patent No.: US 11,048,549 B2
(45) Date of Patent: Jun. 29, 2021

(54) TRANSFERRAL OF PROCESS STATE AND/OR COMPONENTS IN COMPUTING ENVIRONMENTS

(71) Applicant: Google LLC, Mountain View, CA (US)

(72) Inventors: Christopher Jonathan Phoenix, Mountain View, CA (US); Christopher Ryan Johnson, Sausalito, CA (US); Jeffrey Brown, Mountain View, CA (US)

(73) Assignee: Google LLC, Mountain View, CA (US)

( * ) Notice: Subject to any disclaimer, the term of this patent is extended or adjusted under 35 U.S.C. 154(b) by 123 days.

(21) Appl. No.: 16/375,189

(22) Filed: Apr. 4, 2019

(65) Prior Publication Data

US 2020/0319918 A1    Oct. 8, 2020

(51) Int. Cl.
*G06F 9/46* (2006.01)
*G06F 9/48* (2006.01)
*G06F 9/50* (2006.01)

(52) U.S. Cl.
CPC .......... *G06F 9/4843* (2013.01); *G06F 9/5027* (2013.01)

(58) Field of Classification Search
CPC ............................ G06F 9/4843; G06F 9/5027
See application file for complete search history.

(56) References Cited

U.S. PATENT DOCUMENTS

| | | | | |
|---|---|---|---|---|
| 5,138,713 A * | 8/1992 | Loten | ........................ | G06F 9/52 714/819 |
| 5,404,520 A * | 4/1995 | Sonobe | ............. | G06F 16/24532 718/101 |
| 5,809,248 A * | 9/1998 | Vidovic | .................... | G06F 9/46 709/219 |
| 5,961,582 A * | 10/1999 | Gaines | .................. | G06F 9/4843 718/1 |
| 6,101,327 A * | 8/2000 | Holte-Rost | ........ | H04Q 3/54516 717/170 |
| 6,314,567 B1 * | 11/2001 | Oberhauser | ............. | G06F 8/656 717/170 |
| 7,225,448 B2 * | 5/2007 | Himmel | ................ | G06F 1/3203 710/19 |
| 7,296,073 B1 * | 11/2007 | Rowe | .................. | H04L 61/1582 709/227 |
| 7,484,208 B1 * | 1/2009 | Nelson | ................ | G06F 9/45558 718/1 |

(Continued)

FOREIGN PATENT DOCUMENTS

| | | |
|---|---|---|
| CN | 101369241 A | 2/2009 |
| EP | 3399407 A1 | 11/2018 |
| WO | 2013191995 A1 | 12/2013 |

OTHER PUBLICATIONS

Hua Zhong and Jason Nieh, Crak: Linux Checkpoint/Restart As a Kernel Module,(best copy), Nov. 2001, 18 pages.

(Continued)

*Primary Examiner* — Adam Lee
(74) *Attorney, Agent, or Firm* — Botos Churchill IP Law

(57) ABSTRACT

This technology relates to transferring state information between processes or active software programs in a computing environment where the a new instance of a process or software program may receive such state information even after an original or old instance of the process or software program that owned the state information has terminated either naturally or unnaturally.

19 Claims, 8 Drawing Sheets

(56) References Cited

U.S. PATENT DOCUMENTS

| | | | |
|---|---|---|---|
| 8,020,163 B2* | 9/2011 | Nollet | G06F 15/7825 |
| | | | 718/104 |
| 8,095,826 B1 | 1/2012 | Deolasee | |
| 8,127,316 B1 | 2/2012 | Binotto et al. | |
| 8,589,940 B2 | 11/2013 | Lim et al. | |
| 9,049,265 B1* | 6/2015 | Greenfield | H04L 67/1097 |
| 9,455,879 B1* | 9/2016 | Mentz | H04L 63/10 |
| 9,578,497 B2* | 2/2017 | L'Heureux | H04W 36/0022 |
| 9,591,060 B1* | 3/2017 | Diwakar | H04L 67/10 |
| 9,847,990 B1* | 12/2017 | de Boursetty | H04L 9/3236 |
| 9,960,837 B1* | 5/2018 | Coleman | H04L 67/18 |
| 10,083,098 B1* | 9/2018 | Balmakhtar | G06F 11/301 |
| 2002/0029357 A1* | 3/2002 | Charnell | G06F 9/4491 |
| | | | 714/5.11 |
| 2002/0174331 A1* | 11/2002 | Nock | G06F 9/54 |
| | | | 713/100 |
| 2004/0003085 A1* | 1/2004 | Joseph | H04L 69/16 |
| | | | 709/226 |
| 2004/0049672 A1* | 3/2004 | Nollet | G06F 15/7867 |
| | | | 713/100 |
| 2004/0230661 A1* | 11/2004 | Rashid | H04L 51/24 |
| | | | 709/207 |
| 2005/0049929 A1* | 3/2005 | Hsu | G06Q 20/02 |
| | | | 705/64 |
| 2005/0050170 A1* | 3/2005 | Hsu | G06Q 30/0603 |
| | | | 709/219 |
| 2006/0167893 A1* | 7/2006 | Saravanakumar | H04L 69/40 |
| 2007/0061372 A1* | 3/2007 | Appavoo | G06F 8/656 |
| 2007/0208862 A1* | 9/2007 | Fox | H04L 67/14 |
| | | | 709/227 |
| 2007/0286393 A1* | 12/2007 | Roever | H04L 12/2856 |
| | | | 379/221.1 |
| 2008/0047004 A1* | 2/2008 | Sibley | G06F 21/34 |
| | | | 726/20 |
| 2010/0106765 A1* | 4/2010 | Saito | G06Q 10/107 |
| | | | 709/202 |
| 2010/0146513 A1* | 6/2010 | Song | G06F 1/329 |
| | | | 718/104 |
| 2010/0274858 A1* | 10/2010 | Lindberg | G06F 9/452 |
| | | | 709/206 |
| 2011/0179420 A1* | 7/2011 | Roe | G06F 9/44 |
| | | | 718/102 |
| 2011/0307448 A1* | 12/2011 | Tanaka | G11B 20/00086 |
| | | | 707/641 |
| 2011/0321137 A1* | 12/2011 | Iida | G06F 21/10 |
| | | | 726/4 |
| 2012/0096251 A1 | 4/2012 | Aloni et al. | |
| 2012/0180043 A1* | 7/2012 | Tsirkin | G06F 9/5088 |
| | | | 718/1 |
| 2012/0266179 A1* | 10/2012 | Osborn | G06F 9/5077 |
| | | | 718/105 |
| 2012/0311568 A1* | 12/2012 | Jansen | G06F 9/45558 |
| | | | 718/1 |
| 2013/0031342 A1* | 1/2013 | French | G06F 9/06 |
| | | | 713/2 |
| 2013/0318591 A1* | 11/2013 | Zhu | H04L 9/321 |
| | | | 726/8 |
| 2014/0310241 A1* | 10/2014 | Goyen | G06F 16/178 |
| | | | 707/634 |
| 2015/0009918 A1* | 1/2015 | Yeoum | H04L 65/1059 |
| | | | 370/329 |
| 2015/0286511 A1* | 10/2015 | Mickens | G06F 9/4856 |
| | | | 719/320 |
| 2016/0149854 A1* | 5/2016 | Foti | G06F 9/542 |
| | | | 709/223 |
| 2017/0132070 A1 | 5/2017 | Prasad et al. | |
| 2017/0322991 A1* | 11/2017 | Tran | G06F 16/21 |
| 2018/0196865 A1* | 7/2018 | Rabin | H04L 63/0428 |
| 2018/0248690 A1* | 8/2018 | Fukuda | H04L 9/08 |
| 2018/0314515 A1* | 11/2018 | de Kruijf | H04L 67/34 |

OTHER PUBLICATIONS

Cristiano Giuffrida et al., Safe and Automatic Live Update for Operating Systems, ASPLOS '13, Mar. 16-20, 2013, p. 279, XP055649199, 2 Penn Plaza, Suite 701 New York NY 10121-0701 USA.

Notification of Transmittal of the International Search Report and the Written Opinion of the ISA, or the Declaration for the corresponding PCT/US2019/057405 dated Dec. 12, 2019.

Object-capability model, Wikipedia, Retrieved from the Internet: URL:https://web.archive.org/web/20190322190315/https://en.wikipedia.org/wiki/Object-capability_model [retrieved on Dec. 5, 2019].

\* cited by examiner

400

500

600

700

TRANSFERRAL OF PROCESS STATE AND/OR COMPONENTS IN COMPUTING ENVIRONMENTS

BACKGROUND

Within a typical computing environment computer programs or processes may at times crash (e.g., terminate unnaturally), need to be updated or need to be ported to a remote computer for processing. If a computer program or process is performing tasks, interruption of those tasks by one or more of the foregoing events may impact the performance of the computer program or process. For example, in a server-client environment, if state information (e.g., handles) is lost by any of the foregoing events, a client application may need to reestablish state information to restore or start anew the client application. This may also occur with server processes. Reestablishing state information may prove inefficient in terms of computing resources and time needed to have access to new resources, e.g., handles, virtual memory objects, etc.

BRIEF SUMMARY

One aspect of the disclosed technology provides a computing system for transferring information between computing processes. The system comprises one or more computing devices, one or more computer readable storage media and program instructions, stored on the one or more computer readable storage media, for execution by at least one of the one or more computing devices. The program instructions comprise registering processing information associated with a first process within an operating system, requesting, by a second process after the first process has terminated, the processing information from the operating system, and transferring, by the operating system, ownership of the processing information to the second process.

In this aspect of this technology, transferring ownership may comprise the operating system notifying a spawner of the first process that the second process requested the registered processing information.

As a further example, the program instructions may further comprise transmitting, by the spawner a verification code to the second process. The program instructions may also comprise verifying that the second process is allowed to receive the first process processing information.

In this aspect of this technology, transferring ownership may comprise the operating system receiving one or more capability handles as a portion of the registered processing information.

As a further example, the program instructions may further comprise the operating system transferring the one or more capability handles to a safekeeping process and transferring, by the safekeeping process, the capability handle to the second process. The program instructions may also comprise the operating system transferring the one or more capability handles to a safekeeping process and transferring, by the safekeeping process, the capability handle to the second process.

The program instructions may also further comprise the second process forwarding the one or more capability handles it received to the operating system and the operating system comparing information contained in the capability handle transferred by the safekeeping process to information contained in the capability handle forwarded by the second process.

In this aspect of this technology, the program instructions may further comprise the operating system, in response to receiving notification of an update associated with the first process, notifying the first process of the update. In addition, the operating system may cause spawning of the second process based on the update. Further, in response to being notified of the update, the first process initiates registering the processing information. Further still, in response to detecting the update, the second process initiates requesting the processing information.

In this aspect of the technology, the processing information may comprise state information. State information may generally comprise resources, e.g., handles, threads, memory objects and other data, established in running an old or original process or program that can be used in running a new or replacement process or program.

In another aspect, the technology is a method for transferring information between computing processes. The method comprises registering processing information associated with a first process with an operating system; requesting, by a second process after the first process has terminated, the processing information from the operating system; and transferring, by the operating system, ownership of the processing information to the second process.

In this aspect of the technology, transferring ownership comprises the operating system notifying a spawner of the first process that the second process requested the registered processing information. As an example, the method may also further comprise transmitting, by the spawner, a verification code to the second process and comparing, by the operating system, the verification code provided to the new process to a verification code associated with the first process.

In accordance with this aspect of the technology, transferring ownership may comprise the operating system receiving one or more capability handles as a portion of the registered processing information.

Further in accordance with this aspect of the technology, the operating system, in response to receiving notification of an update associated with the first process, notifying the first process of the update. Further still, the operating system may cause spawning of the second process based on the update. Also, in response to being notified of the update, the first process may initiate registering the processing information. Additionally, in response to detecting the update, the second process may initiate requesting the processing information.

DETAILED DESCRIPTION

Overview

Figure 1:
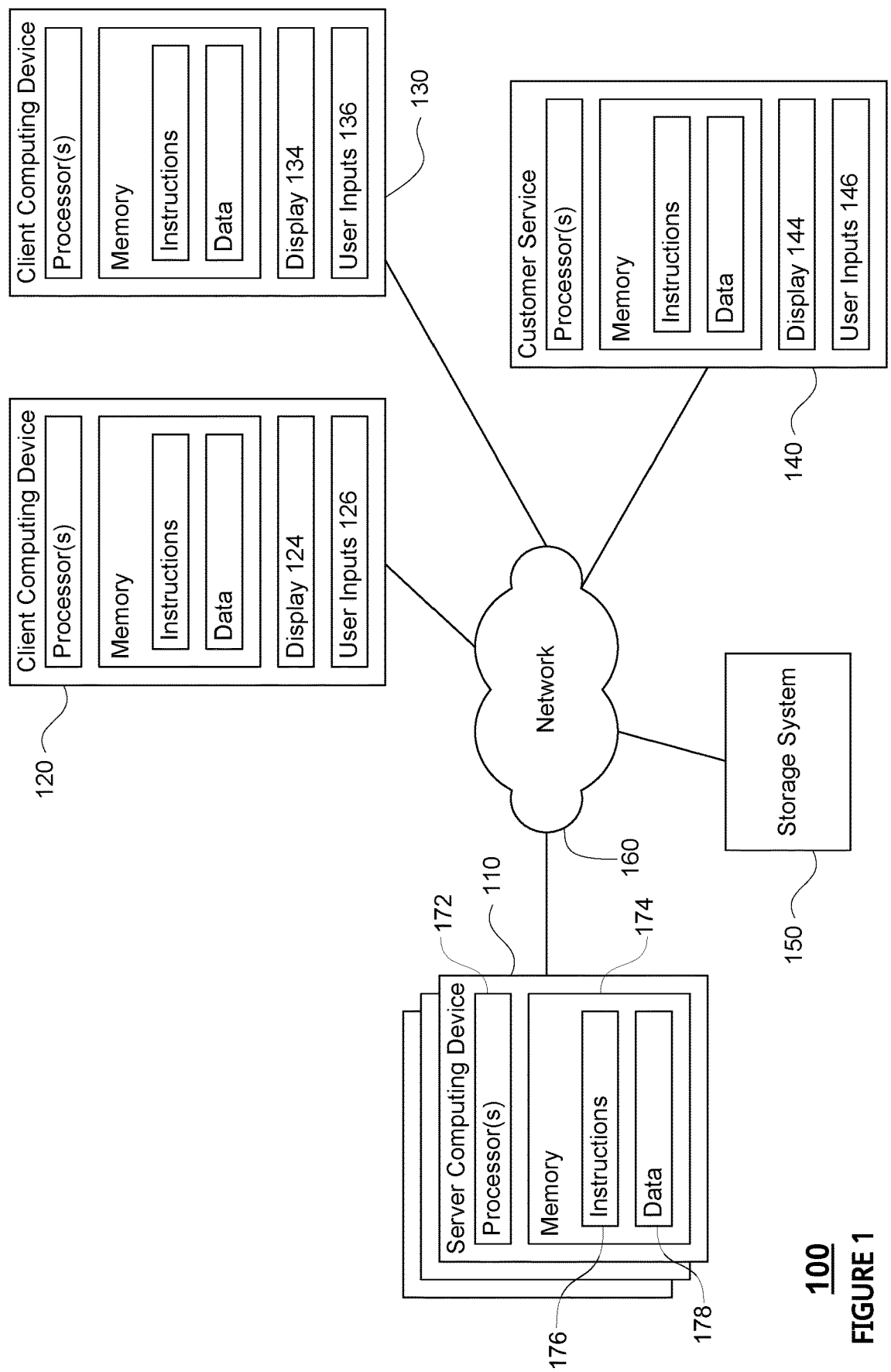
FIG. 1 is an example diagram of a system in accordance with aspects of the disclosure.

The technology relates to updating and/or restoring computer programs or processes in computer systems. Computer programs and processes may suffer errors and enter an unrecoverable state (e.g., "crash") so that their execution has to be terminated unnaturally, their memory discarded and a new or replacement program or process be instantiated to take the place of the original or old program or process. In addition, at times, active or running programs or processes may need to undergo planned version upgrades or transfer execution of the program or process to one or more remote computers. Some programs or processes perform the function of "server" to other client programs or processes, e.g., taking in data, operating on such data and supplying results. In operation, a server process or program typically owns and maintains information, e.g., state information, across multiple exchanges with client processes or programs. The state information generally comprises resources, e.g., handles, threads, memory objects and other data, established in running a process or program. Such resources may be lost (or expire) when the process ends naturally (e.g., completes its function and exits) or unnaturally (e.g., crashes). In other instances, such resources may need to be transferred to another computer or maintained in the presence of an impending software upgrade. If state information is lost and unavailable to a server process or program that replaces a previous instantiation of a process or program that used such state information, clients may need to undertake complicated operations, perhaps working in concert with other clients, in order to restore the proper state to the replacement server process.

In one instance, a process or program running on a computing device that is able to store or archive its state information in a form that can be recovered and used by a future process would allow for seamless and dynamic transfer of such state information in the face of crashes, planned upgrades or making use of remote computing resources. In particular, a function call may be provided by an operating system ("OS") of a computing device that allows prior instantiated server processes (or more generally any process that performs a server or cooperative function to other processes) to store state information outside of its directly accessible memory. Such state information would contain sufficient state information necessary for a newly started or replacement server process to successfully replace a prior instantiated server process. Such a replacement server process would be able to successfully serve client requests even while a sequence of requests is taking place. State information generally comprises information that may be used to resume functioning of a given application without interruption. State information will typically be application or program specific, and would generally comprise a mixture of operating system resources (memory buffers, handles, channels, sockets) and the application state (e.g. authentication information, current operational settings (e.g., volume setting, video format, etc.), etc. For instance, in a user interface application, the state information may comprise a current layout of the interface; for a long-running computation the state may comprise a recent value computed and an algorithm for resuming the computation. Stated another way, state information generally comprises information that allows migration of an application's or program's state incrementally while the application or program runs and respond to requests.

More specifically, state information (e.g., one or more handles/sockets or capabilities and other optional state information) may be stored by a prior instantiated or old process to the OS at any time. For example, the handle/socket or capability stored by the old process may include a handle to a virtual memory object ("VMO") which would allow storage of additional data, which would be readable once the handle is retrieved and restored. Subsequently, in response to a request for a read function call from a properly validated successor process, the OS may perform the internal operations necessary to automatically transfer ownership of the transferred or stored state information to a replacement or new process, and allow the replacement or new process to read the state information (e.g., handles and other state information).

With respect to transferring ownership to a replacement or new process, to maintain security a determination may be made by the OS to verify whether the new or replacement process has the necessary rights to access the state information of the old or original process. For instance, this may be achieved by use of one or more secret tokens or keys. More specifically, state information stored in association with a token may be read only by a new or replacement process that possesses the token. A spawner of a server process may, for example, provide the same key or token both the original or old process and the replacement or new process, which would have started after the original or old process was no longer running. In a capability-based OS, verification of access rights to the state information may be implemented by means of a capability. The capability would be provided to the OS as part of the function call that stores the original state information, passed to another process for safekeeping and then passed to new or replacement process allowing it to restore the original state information. In practice, a server manager could receive the capability and then pass it to new incarnations or instances of the server process. Alternatively, an application update process may receive the capability from an application that it was about to upgrade, and then pass the capability to the new application once it restarted.

The OS may also provide as a feature translation of state information supplied by the old or original process to make them valid or readable to the new or replacement process. The translation feature may be provided as part of the OS's transferral of ownership between an old and a new process. Such translations may be performed similar to those that are done when passing state information, such as resources, between concurrent running processes.

As an example, the storage or archiving of state information may be implemented using a system call such as zx_snapshot_store( ), or more generally call_store( ). Such a call would allow, for example, an array of handles and moderate amount of data to be stored. In this way, the state information being stored may be data light. Another system call such as zx_snapshot_recover( ) or more generally call_recover( ) may be implemented to allow a new or replacement process to read or obtain the state information previously owned by the old or original process.

A server process may "checkpoint" its state after each new client connects and establishes state information for serving a sequence of requests. If the server process unexpectedly crashes or is terminated, a new or replacement server process would then be able to request the handles, which, since they were stored in the checkpoint service, would have been suspended rather than deleted when the old process died. In a case where a process wanted to checkpoint its state to guard against unexpected crashes, there may be multiple writes or stores for every read. Thus, a third system call zx_snapshot_initialize( ) or more generally call_initialize, which would return a pair of handles. One handle would be passed to the old or original process and could be used for writing snapshots to the operating system via zx_snapshot_store( ). The other handle would be passed to the "new" process and could be used, once, for passing to zx_snapshot_recover( ). In addition, in the case of a server, the new or replacement process would also receive an additional handle of storing its own snapshots.

In another instance, the technology may be implemented to facilitate updating parts or portions of an OS or end-user software without interrupting or having to restart the system. For example, as software evolves new features are typically added and errors, flaws or faults in the software must sometimes be fixed. Where the software that is being updated is a component of the entire system (e.g., the OS), updating may require re-starting the system. Re-starting the system may be inconvenient to a user at a given time, which may result in an update being delayed. This may expose the software and system to additional risks, e.g., security risks if the update is a security fix. In this instance, by employing the "snapshot" calls and/or other features described above, software may be updated transparently including, for example, without interrupting ongoing workflow. The other features may include one or more OS components that communicate through inter-process communication. The other features may also include a transition protocol for transferring forward-compatible state information (e.g., handles and other information) to an updated process. With regard to this latter feature, rather than explicitly write state information to storage, e.g., such as a database, state is written in a forward-compatible format to a memory buffer that can be transferred to a new process. As such, the persistence for the running software is maintained implicitly by the program without typically requiring explicit check-pointing or saving state information. The format of the forward-compatible buffer may be similar in principle to Protobuf and Flatbuffers, which provide forward compatible data serialization for remote procedure calls.

This technology is applicable to system components (e.g., OS), for which in-place upgrades are typically ascribed more value, and non-system components (e.g., end-user applications). System components maintain, for example, a list of handles representing connections with clients, connections with other system components, and operating system resources used by the component itself. This technology may overcome a challenge in updating system components or bringing up a new version of the component that has access to and knows how to interpret a list of handles and internal state of the old instance or process.

With regard to the updating aspect of the disclosed technology, the technology may be generally implemented by notifying the OS of an update, performing a handshake to initiate transfer of state and capabilities pertaining to active tasks being performed by the old instance or process and completing such transfer to the new/replacement instance or process, resuming old tasks and, if necessary, initiating new tasks by the new/replacement instance and terminating the old instance/replacement instance.

One or more aspects of the disclosed technology may be implemented to improve computing technologies including server and client performance and/or OSs, such as for example, capability based OSs. For example, in recovering from server crashes, one or more clients may not, at the necessary moment, be in a state where the operations necessary to recover from a crash may be readily performed. In addition, the client functionality necessary to restore server state may be difficult to test adequately, particularly where clients may need to interact and server crashes may happen at random times. For example, it is not uncommon for process A to first give a resource to process B, which then passes it to the server. Process A may not monitor the server's health or know when it has crashed. Thus, to recover from the server crash, process B will have to interrupt whatever it is doing, request a new resource for process A, give that resource to the server, before process B can again use the server's functionality. One or more of the above disclosed features of this technology may avoid or at least mitigate the need to have another process interrupt the tasks it may be performing so that an interrupted process may recover from a server crash. In addition, the disclosed features of this technology may mitigate the effects of server crashes for which there was not full recovery as to avoid function degradation and/or improper operation elsewhere in the system. In addition, this technology mitigates security risks exposures caused by having processes exchange, for example, handle information outside the purview of the OS.

One or more aspects of the disclosed technology may, for example, reduce the complexity of operations that may need to be performed on the client side and may result in simplification of the client. For example, there may be no need to recover code on the client side as the OS would have state and other information necessary to have the new/replacement process take over the function at the client without noticeable impact on performance of the client application.

Example Systems

FIG. 1 is a pictorial diagram of an example system 100 that includes a plurality of computing devices 110, 120, 130, 140 and a storage system 150 connected via a network 160. As shown in FIG. 1, each of computing devices 110, 120, 130 may include one or more processors, memory, data and instructions. For example, server computing device 110 includes one or more processors 172, memory 174, instructions 176 and data 178.

The memory 174 stores information accessible by the one or more processors 172, including instructions 176 and data 178 that may be executed or otherwise used by the processor(s) 172. The memory 174 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 176 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Processes, functions, methods and routines of the instructions are explained in more detail below.

The data 178 may be retrieved, stored or modified by processor 172 in accordance with the instructions 176. As an example, data 178 associated with memory 174 may comprise data used in supporting services for one or more client devices, e.g., 120, 130 or more. Such data may include data to support hosting web-based applications, file share services, communication services, gaming, sharing video or audio files, or any other networked based services.

The one or more processor 172 may be any conventional processor, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be located or stored within the same physical housing. In one example, one or more computing devices 110 may include one or more server computing devices having a plurality of computing devices, e.g., a load balanced server farm, that exchange information with different nodes of a network for the purpose of receiving, processing and transmitting the data to and from other computing devices.

The network 160, and intervening nodes, may include various configurations and protocols including short range communication protocols such as Bluetooth™ Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

As shown in FIG. 1, each client computing device 120, 130, 140 may be a personal computing device intended for use by a user and have all of the components normally used in connection with a personal computing device including a one or more processors (e.g., a central processing unit (CPU)), memory (e.g., RAM and internal hard drives) storing data and instructions, a display such as displays 124, 134, 144 (e.g., a monitor having a screen, a touch-screen, a projector, a television, or other device that is operable to display information), speakers, and user input devices 126, 136, 146 (e.g., a mouse, keyboard, touchscreen or microphone). The client computing devices may also include a camera for recording video streams, speakers, a network interface device, and all of the components used for connecting these elements to one another.

Client computing device 140 may also be a workstation associated with the network devices, e.g., one or more server computing devices 110, and used for administration and/or maintenance. In this regard, client computing device 140 may be operated by a network administrator who supports, maintains and manages security associated with server computing devices 110. With regard to maintenance, the client computing device 140 may enable the network administrator to access information about the servers such as the current version of software running on the server and installing updates, patches, etc. Again, although only a single customer service work station is depicted in FIG. 1, the system may actually include tens or hundreds of such workstations and network administrators.

Although the client computing devices 120, 130, 140 may each comprise a full-sized personal computing device, they may alternatively comprise mobile computing devices capable of wirelessly exchanging data with a server computing device (such as the server computing devices 110) over a network such as the Internet. By way of example only, client computing device 120 may be a mobile phone or a device such as a wireless-enabled PDA, a tablet PC, a wearable computing device or system, or a netbook that is capable of obtaining information via the Internet or other networks. In another example, client computing device 130 may be a wearable computing system, such as a smartwatch. As an example the user may input information using a small keyboard, a keypad, microphone, using visual signals with a camera, or a touch screen.

As with memory 174, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown, and/or may be directly connected to or incorporated into any of the computing devices 110, 120, 130, etc. Storage system 150 may store various types of information as described in more detail below. This information may be retrieved or otherwise accessed by one or more server computing devices, such as the devices 110, and/or one or more client computing device, such as the client computing device 120, in order to perform some or all of the features described herein.

Figure 2:
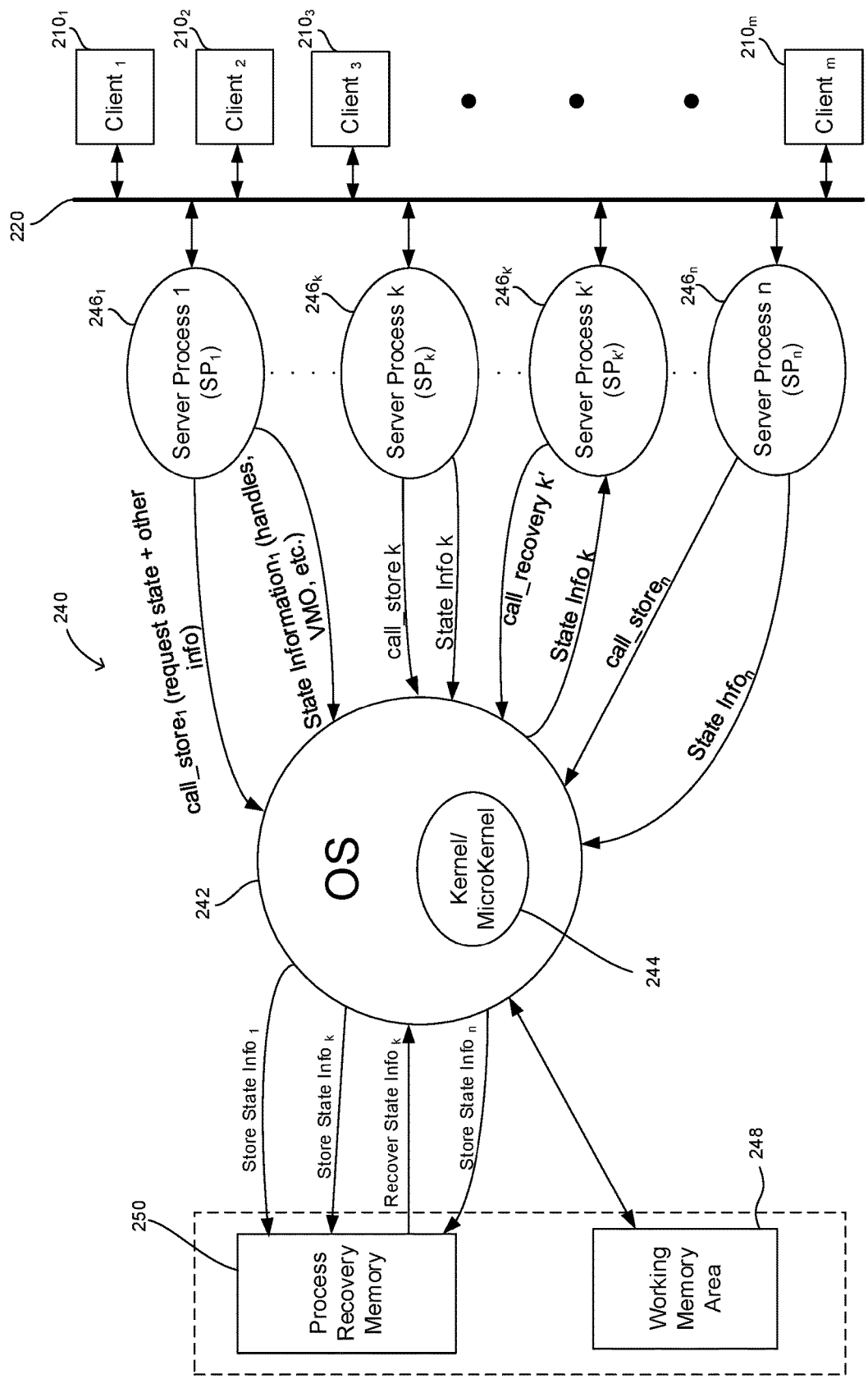
FIG. 2 is an example functional diagram of a system in accordance with aspects of the disclosure.

FIG. 2 is an example functional diagram of a system 200 in accordance with aspects of the disclosure. The system 200 includes one or more client computing devices $210_1$ through $210_m$ communicating over network 220 to a server computing device 240. Computing devices 201 may comprise client computing device 120, 130 described above in relation to FIG. 1. Network 220 may comprise one or more of the networks described in relation to network 160. Server computing device 240 is shown functionally but may comprise a server computing device 110 described in relation to FIG. 1. While FIG. 2 provides an example with a single server computing device 240, the system 200 may comprise multiple server computing devices operating in parallel and/or in cooperation, and similarly, to server computing device 240.

Server computing device 240 includes an OS function 242. OS function 242 may comprise a kernel or microkernel 244 (including the case of capability based OS). The kernel comprises the inner core of the OS and typically has complete control over operation of the computer system and generally connects software applications to the hardware used to run such applications. A microkernel typically implements a smaller subset of functionality provided via a kernel. OS 242 communicates with one or more Server Processes (SP) 246. OS 242 also communicates with one or memory locations, 248, 250. Memory location 248 is used by OS 242 to operate and will be loaded with programs or instructions that are necessary for OS 242 to perform its function. For example, memory location 248 will typically be loaded with the kernel/microkernel code. Memory location 250 is memory set aside to store state information or data involved in restoring a server process 246 in accordance with this technology.

In operation, for example, a server process, e.g., $SP_k$, may issue a system call recognized by the OS 242 as request for a service to store state information. Such a call may be generally referred to as call_store. More specifically, such a system call may be implemented as zx_snapshot_store( ). When a server process issues such a system call to OS 242, the OS takes the necessary steps to receive and store state information associated with the server process (e.g., State Info.$_k$). The state information generally comprises resources, e.g., may include handles, threads, memory objects and other data, established in running a process or program. Other data may for example include information about the settings for a client application supported by the server process, e.g., the volume or video quality setting for a video playing on a client device. Upon receiving the state information, the OS 242 then stores the state information into a process recovery memory 250 location. In this example, $SP_k$ may be considered the old or original process. It may issue a call_store or zx_snapshot_store periodically to OS 242 or when it detects a change in state information that is normally stored as part of this system call.

In the event $SP_k$ terminates, crashes or needs to updated for example, and needs to replaced by server process $SP_{k'}$, $SP_{k'}$ may issue a system call to OS 242 requesting recovery of the state information which $SP_k$ requested be stored by OS 242. The system call issued by $SP_{k'}$ may be generally referred to as call_recovery and may be implemented as zx_snapshot_recovery( ). In response to receipt of $SP_{k'}$'s call_recovery request, OS 242 verifies that the $SP_{k'}$'s is allowed access to the information stored on behalf of $SP_k$. If verification is successful, State Info.$_k$ is then provided by OS 242 to $SP_{k'}$. $SP_{k'}$ may then replace $SP_k$ and $SP_k$, if not already terminated, may be terminated. $SP_{k'}$ may then continue in its place and perform old and new tasks necessary to have the process previously supported by $SP_k$ run as normal.

Example Methods

Figure 3:
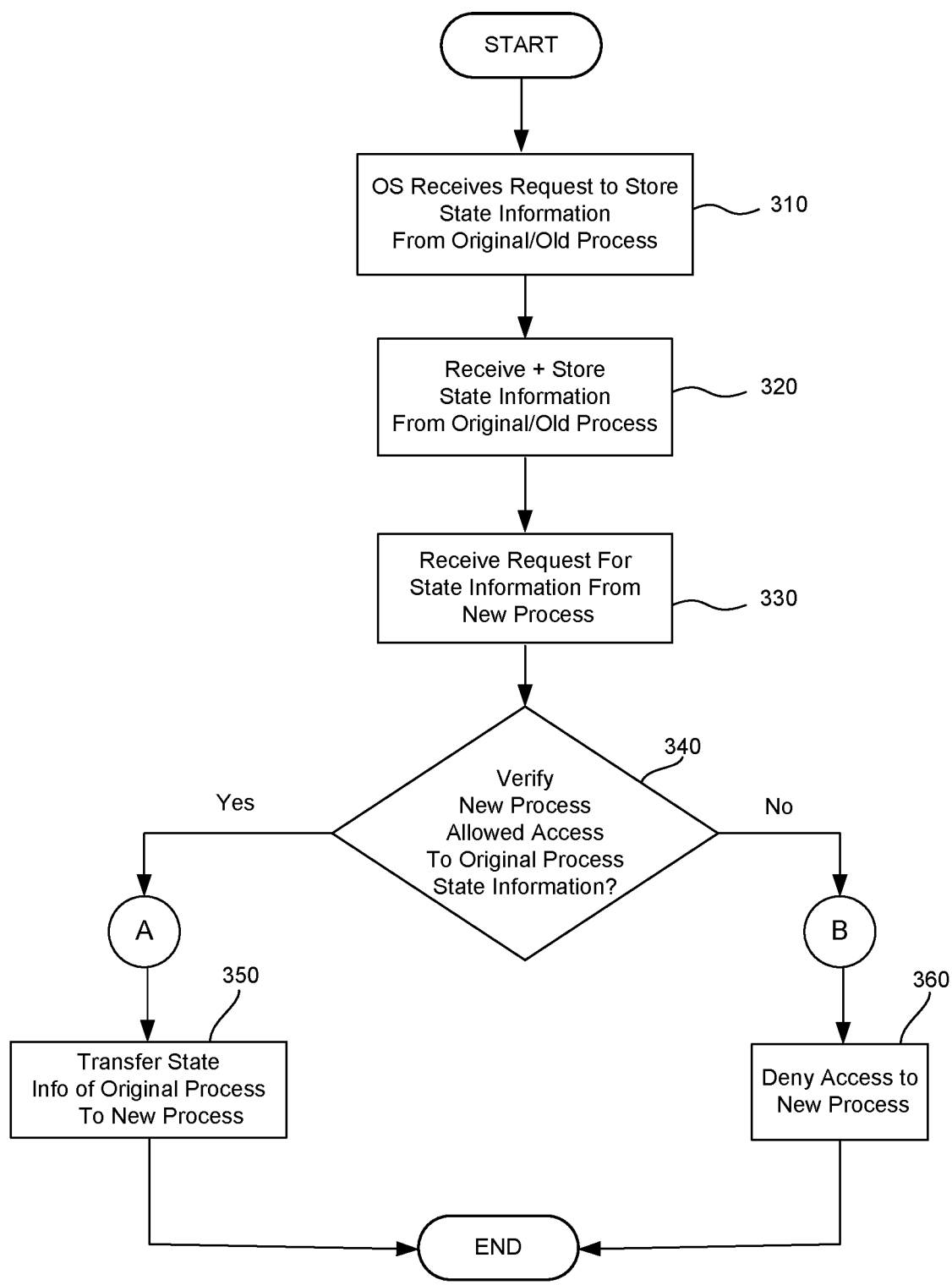
FIG. 3 is an example flow diagram in accordance with aspects of the disclosure.

In addition to the operations described above and illustrated in the figures, various operations will now be described. It should be understood that the following operations do not have to be performed in the precise order described below. Rather, various operations can be handled in a different order or simultaneously, and operations may also be added or omitted. For instance, FIG. 3 is an example flow diagram 300 in accordance with aspects of the disclosure. More specifically, FIG. 3 shows a flow of a method 300 for storing and retrieving state information.

As shown, at block 310, OS 310 receives a request from a server process to store state information associated with an original/old process currently running. The state information storage request received at the OS in accordance may be in accordance with the system call, call_store, described above. The OS would then take the necessary steps to have the server process provide the state information associated with an original/old process and store it for possibly later usage, block 320. Subsequently, the OS may receive a request to recover the state information, block 330, via a call_recover system call from the new or replacement process.

At block 340, the OS then invokes its verification process 340 with respect the new or replacement process. If the OS verifies that the new or replacement process is authorized to receive the state information, then such state information is transferred to the new process, block 350. As explained above, in this case, the old or original process may then terminate. If the OS is unable to verify or authenticate the new process as being allowed to receive the state information of the old or original process, then the OS denies access to the state information and does not pass it on to the new process, block 360. In this latter instance, to the extent the old or original process is still running at a given function level, it may not be terminated. In such a case where the old or original process crashed or need to be migrated to a remote computer for processing, the service process and any client applications being served may need to be restarted with new state information.

The processes performed by blocks 340 and 350 comprises at least some of the processes that would be performed as part of the more general step or process of transferring ownership of state information from an old or original process to a new or replacement process. As such, handles associated with resources associated with an old/original process as discussed herein, including for example network sockets, database connections, process identifiers, file identifiers or job identifiers, are transferred to the new/replacement process. As part of ownership transferral, addresses may for example be remapped or socket descriptors may need to be provided (and/or translated) to the new/replacement process so that it can identify the socket the old/original process had used with the old process.

Figure 4:
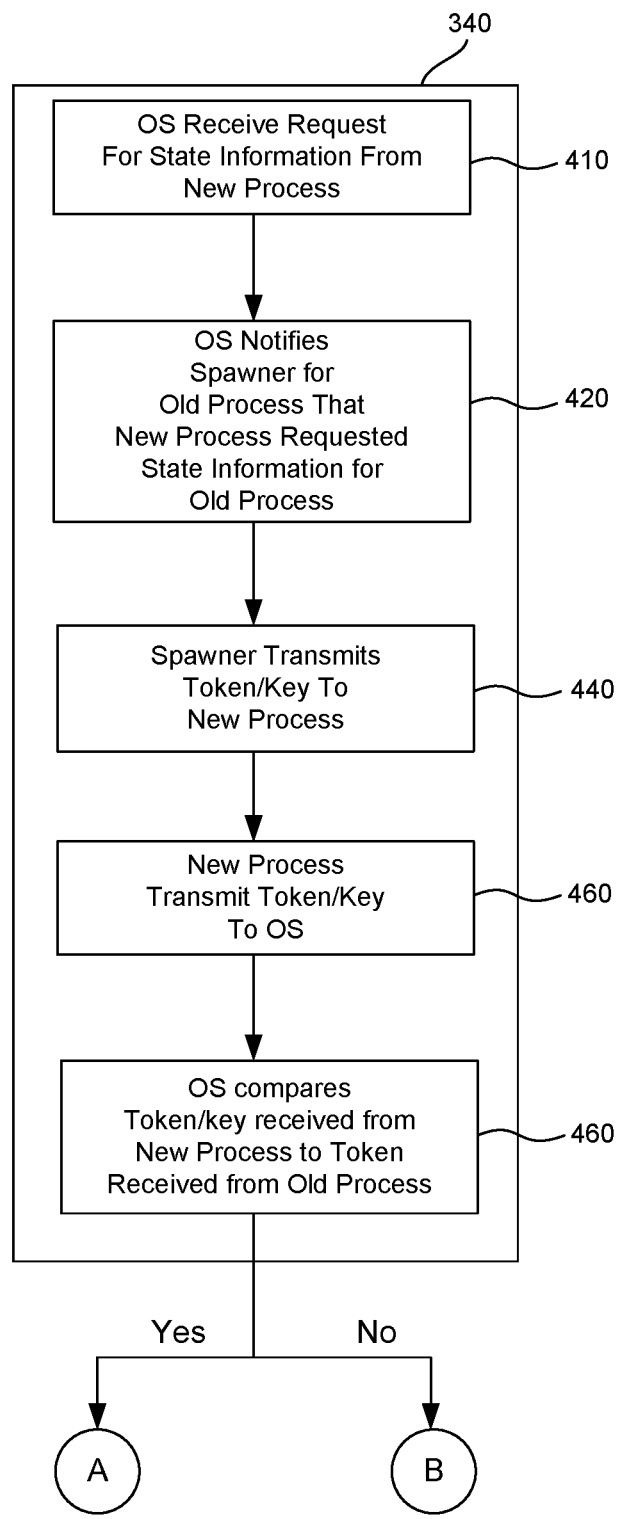
FIG. 4 is an example flow diagram in accordance with aspects of the disclosure.

FIG. 4 is an example flow diagram 400 in accordance with aspects of the disclosure. More specifically, FIG. 4 shows an example of verification process 340. As shown, the verification process begins with receipt of a request for state from a new process, block 410. The OS thereafter notifies a spawner of the old or original process that a new or replacement process seeks state information owned by the old/original process, block 420. A spawner may also be considered a "launcher" or "parent." It may comprise code storing state information in accordance with the disclosed technology. It may also be a separate server, a parent process, or the kernel itself. It may also be some combination of the previous working server and/or kernel, for example: 1) the entity storing the recovery data, 2) the entity responsible for starting a process, and/or 3) the entity responsible for transferring the recovery data to the new process. For example, the kernel may store recovery data and a separate "launcher server" may be responsible for restarting a process and instructing the kernel to transfer the recovery data. As the spawner created the old/original process, it would have access to a token/key that the old process also has access to and provided to the OS in terms of establishing ownership of the old/original process. At block 440, the spawner transmits the key/token to new/replacement process identified by the OS. At block 450, the spawner provides the key/token to the new/replacement process. At block 460, having received the key/token from the new/replacement process, the OS compares that key/token with the key/token it previously received from the old/original process. If there is a match, the method proceeds to A (see FIG. 3). If there is no match, the process proceeds to B (see FIG. 3).

Figure 5:
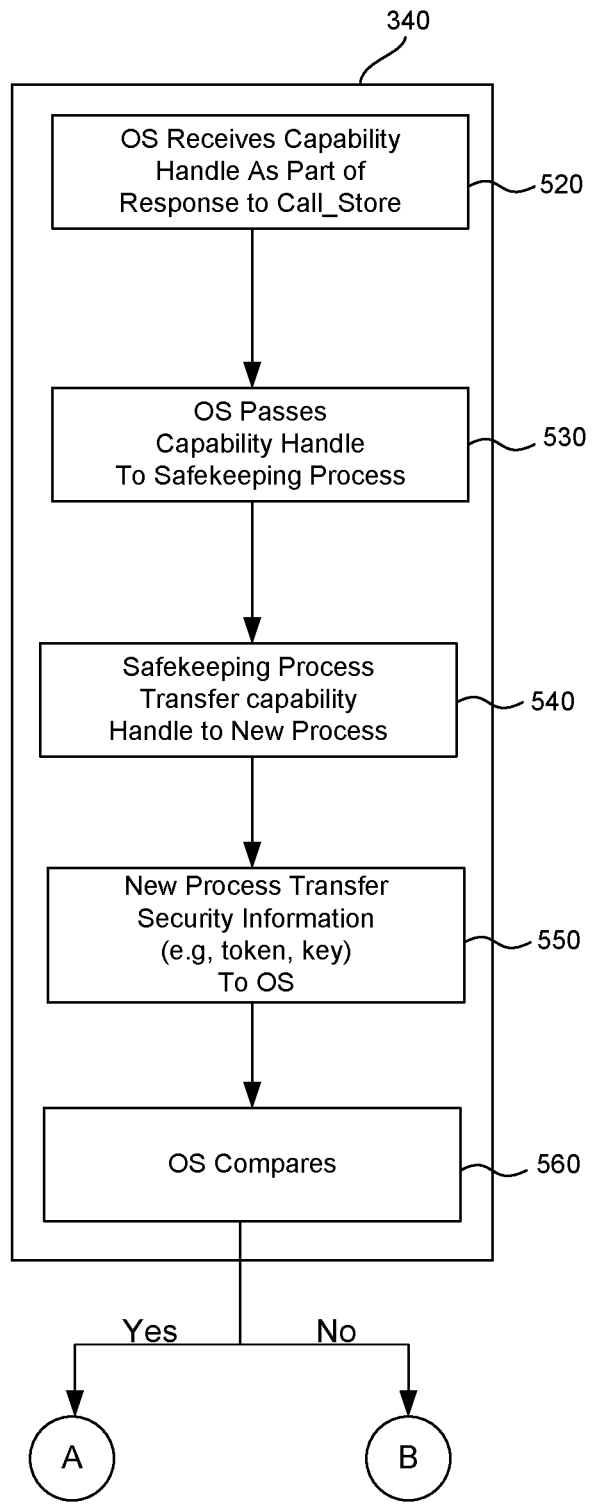
FIG. 5 is an example flow diagram in accordance with aspects of the disclosure.

FIG. 5 is an example flow diagram 500 in accordance with aspects of the disclosure. More specifically, FIG. 5 shows another example of verification process 340. This process may find use in capability based OSs, such OSs generally use capability based security techniques. As shown in FIG. 5, in this example, the OS receives a capability handle as part of the information provided in association with the call_store, block 520. The OS thereafter passes the capability handle to the a safekeeping process, block 530. The safekeeping process thereafter transfers the capability handle to the new/replacement process, block 540. The new process thereafter transfers the security information provided as part of the capability information to the OS, block 550. At block 560, The OS thereafter compares the security information with the key/token and/or other security information it previously received from the old/original process. If there is a match, the method proceeds to A (see FIG. 3). If there is no match, the process proceeds to B (see FIG. 3).

Figure 6:
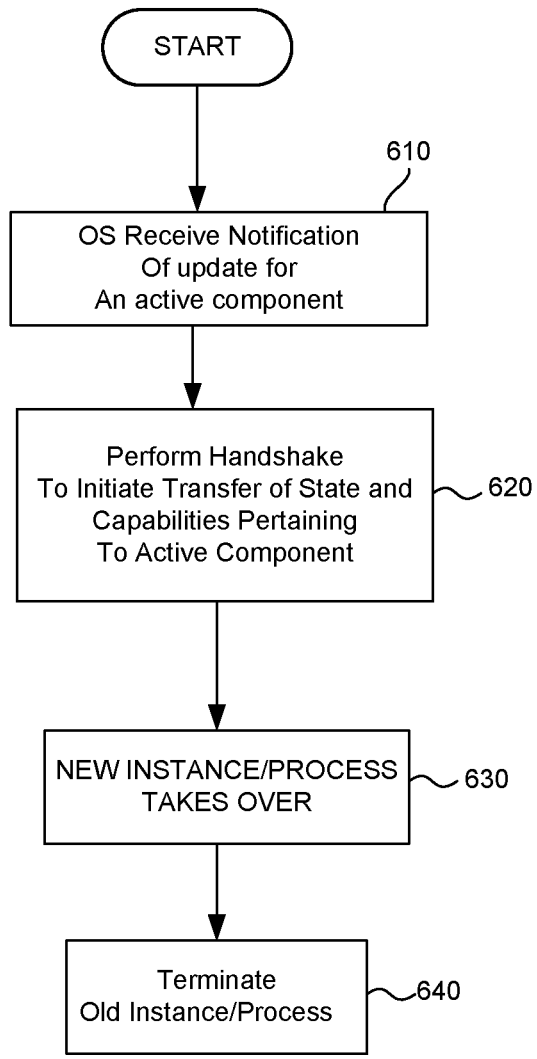
FIG. 6 is an example flow diagram in accordance with aspects of the disclosure.

FIG. 6 is an example flow diagram 600 in accordance with aspects of the disclosure. In particular, FIG. 6 shows a high level flow diagram for use in updating a portion of an OS or end-user software. As shown at block 610, the OS is notified of an update associated with an old/original active system component. At block 620, a handshake is performed and includes the old/original component initiating transfer of state information and capabilities pertaining to active tasks that it may be performing. At block 630, a new component is started. At block 640, the old components is then terminated.

Figure 7:
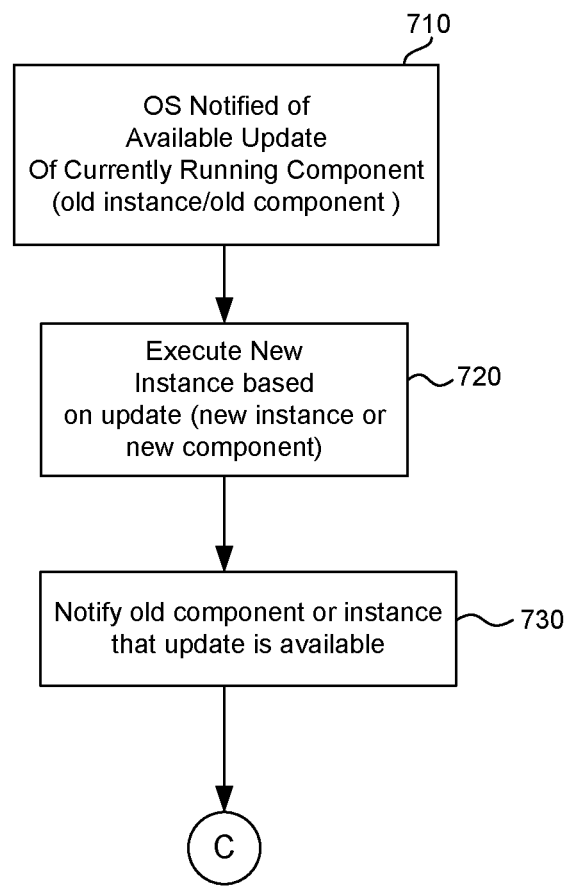
FIG. 7 is an example flow diagram in accordance with aspects of the disclosure.

Turning now to FIG. 7, there is shown an example flow diagram 700 in accordance with aspects of the disclosure. FIG. 7 shows in more detail the sub-operations performed in block 610 of FIG. 6. In particular, at block 710, the OS is notified of an available update for a component currently running or active. This may be consider an old component or old instance associated with a service being performed. In general, a component may be thought of as some unit of execution, and an instance is that unit of execution actually running. At block 720, a new instance/component is instantiated. At block 730, the OS then notifies the old component/instance that the update is available. At this stage the notification stage of the process is completed and the method continues on to C, as is shown in FIG. 8.

Figure 8:
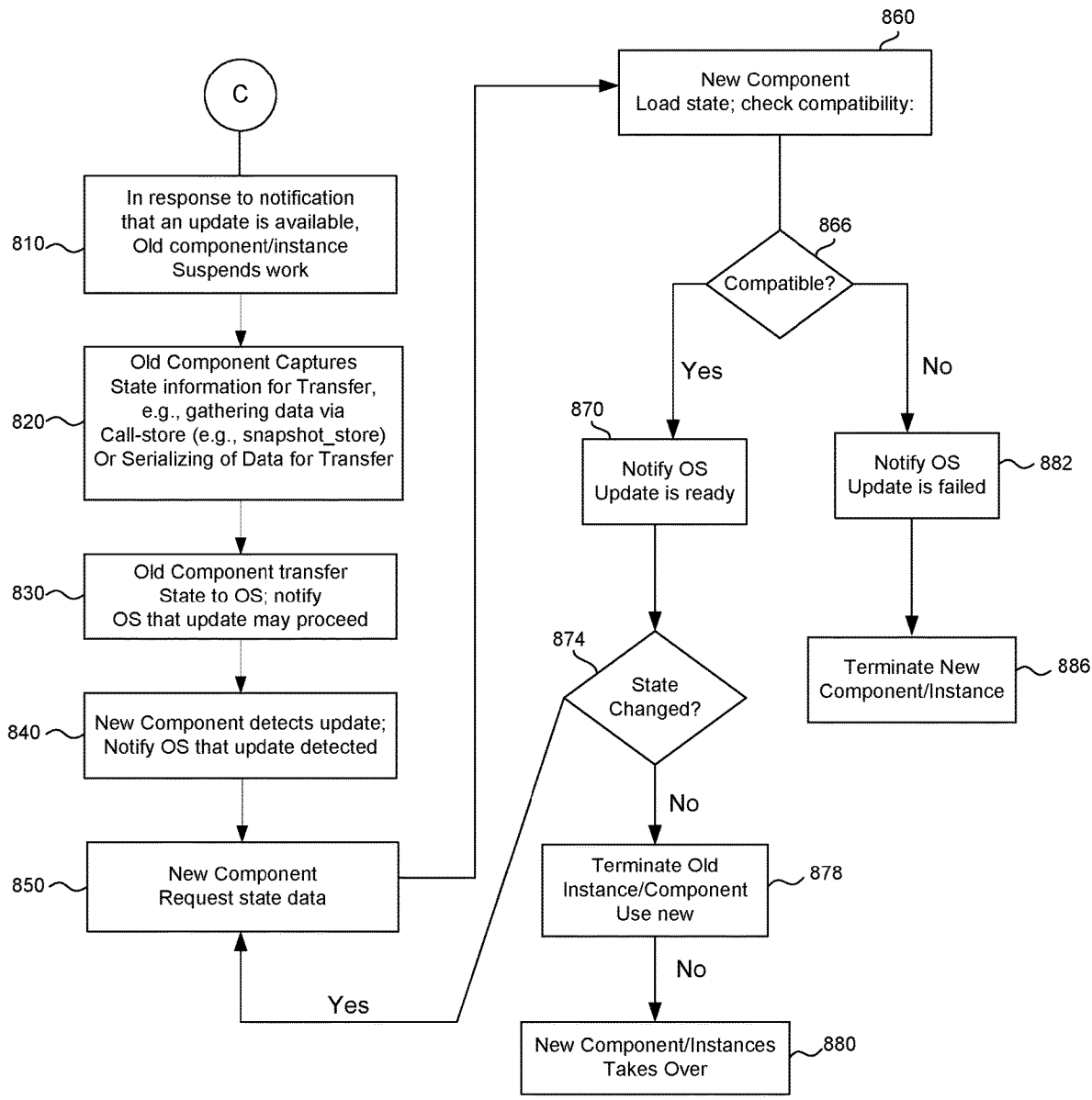
FIG. 8 is an example flow diagram in accordance with aspects of the disclosure.

FIG. 8 is an example flow diagram 800 in accordance with aspects of the disclosure. In particular, FIG. 8 describes in more detail blocks 620, 630 and 640 of FIG. 6. At block 810, the old component/instance suspends work in response to notification, e.g., from the OS, that an update is available. At block 820, the old component/instance may capture state information for transfer as part of call_store, e.g., zx_snapshot_store( ), or serializing data for transfer to the new instance of the software (either over a channel, socket, file, shared memory region or other means of communication). At block 830, the old component then transfer state information to the OS and notify the OS that the update may proceed. As such, at this point the two instances of the program, e.g. old and new, proceed to complete a handshake protocol. Such a protocol may be implemented cooperatively (through program logic while the old and new program instances run concurrently) or non-cooperatively (through system intervention during which one or both instances is suspended while the transfer takes place).

At block 840, the new component detects the update and notifies the OS that the update is detected. At block 850, the new component then requests the state information previously received from the old component and stored by the OS. Such a request may be implemented via zx_snapshot_store( ). At block 860, the new component then loads the acquired state information and checks for compatibility. If compatibility is found at decision diamond 866, then the new component notifies the OS that the update is ready, block 870. At block 874, a determination is made as to whether the state information has changed. If it has, processing proceeds to 850 and proceeds as previously discussed. If at decision diamond 874, it is determined that the state has not changed, then at block 878, the old component/instance is terminated. At block 880, the new component/instance then takes over and operations proceed with the updated component, or software.

Returning to decision diamond 866, if incompatibility is detected, the new component/instance notifies the OS of same, block 882. Thereafter, the new component/instance is terminated, block 886. Additionally, operations continue with the old components.

As discussed above, the transfer of state information from the old component/instance to the new component/instance takes place via blocks 850, 860.

The specific transfer mechanism is implementation specific, but common strategies would be: orthogonal, "safe-state," or ad-hoc. The transfer may involve multiple round-trips, such as draining connection queues or incrementally transferring large pieces of data. In all cases, a mechanism such as the one described above in relation to zx_snapshot_store( ), zx_snapshot_recover( ) and/or zx_snapshot_initial( ) may be useful to complete the final transfer of handles to the new process.

An orthogonal strategy would persist program state without explicit synchronization operations. An example would be using a shared memory buffer as the only read/write runtime state. A component being updated could be paused or terminated by the system, and the shared memory buffer would be transferred to the new version. A "safe-state" strategy would use the incoming update notification to allow the program to halt its threads at specially denoted "safe places." This process may be simplified for developers, e.g., the program's framework or the language runtime may be modified to support updates (similar to how garbage collected language runtimes have special "safepoint" annotations to determine when the garbage collector can run). Other ad-hoc persistence strategies may be used as well, including but not limited to explicitly serializing internal state when requested and sending it to the new instance.

The data format used by the program may be forward-compatible, but otherwise can be defined on a per-program basis. The following properties may be found desirable: 1. The data may be updated in place. This avoids an expensive serialization/deserialization step during state transfer. 2. Data may be freed and reused if the data is stored in place, ensuring a small memory footprint at the expense of garbage collection. 3. Data is self-describing, so that updated programs can evolve their state over time.

Protobuf and Flatbuffers may be useful options for self-describing formats, though they cannot be updated in-place. A more general "memory heap" implementation, which can be as sophisticated as needed (with recounting, garbage collection, etc.), could support in-place updates and reusing space. The resumption of old tasks and taking on of new ones is entered when (and if) the hand-off completes successfully. The new instance takes over the responsibilities of the old instance. Shutting down old instances is entered regardless of the success of the handoff. If the handoff succeeded, the old instance may be terminated (either by cooperatively exiting or by explicit termination). If the hand-off fails, the old instance continues performing its responsibilities as before. The new instance may be terminated and restarted later or it may continue to run until the old instance eventually terminates and the new instance can take over its responsibilities without preservation of state and connections. The explicit check for state not changing of the handshake protocol permits implementations that allow the old component to continue serving requests, but if its state changes the handshake must be restarted. If forward progress does not need to be guaranteed, the implementation may avoid suspending work in progress in preparation for the update.

This disclosure supports a type of cooperative persistence that may be found useful in solving real usability problems in modern systems. Users do not want to be interrupted to update software, even if that opens them up to security issues. Solving the problem using in accordance with this encourages developers to build small services that are independently updateable. The end result is a persistent operating system that may need to restart in very rare cases.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computing system comprising:
   one or more server computing devices;
   a storage system memory that is operatively coupled with the one or more server computing devices;
   one or more non-transitory computer readable storage media; and
   program instructions, stored on the one or more non-transitory computer readable storage media, for execution by the computing system, the program instructions comprising:
   storing, by an operating system of the one or more server computing devices and in the storage system memory, state information associated with a first server process executing within the one or more server computing devices, the state information describing resources of the computing system used by the first server process for executing a process or program requested by one or more client computing devices;
   executing, by the first server process, the process or program requested by the one or more client computing devices using the resources;
   after the first server process has terminated, receiving, by the operating system, a request for the state information from a second server process executing on the one or more server computing devices that replaces the first server process;
   after receiving the request, transferring, by the operating system, ownership of the state information stored in the storage system memory to the second server process, the ownership enabling the second server process to use the state information to continue execution of the process or program requested by the one or more client computing devices; and
   after completion of the transferring, accessing, by the second server process, the state information stored in the storage system memory, and continue executing, by the second server process, the process or program requested by the one or more client devices using the resources described by the state information.

2. The computing system of claim 1, wherein transferring ownership comprises the operating system notifying a spawner of the first server process that the second server process requested the stored state information.

3. The computing system of claim 2, further comprising transmitting, by the spawner a verification code to the second server process.

4. The computing system of claim 3, further comprising verifying, by the operating system, that the second server process is allowed to access the state information associated with the first server process.

5. The computing system of claim 1, wherein transferring ownership comprises the operating system receiving one or more capability handles as a portion of the stored state information.

6. The computing system of claim 5, further comprising the operating system transferring the one or more capability handles to a safekeeping process and transferring, by the safekeeping process, the one or more capability handles to the second server process.

7. The computing system of claim 6, further comprising the second server process forwarding first information included in the one or more capability handles it received to the operating system, and the operating system comparing the first information and second information included in the one or more capability handles received by the operating system.

8. The computing system of claim 1, further comprising the operating system, in response to receiving notification of an update associated with the first server process, notifying the first server process of the update.

9. The computing system of claim 8, further comprising the operating system causing spawning of the second server process based on the update.

10. The computing system of claim 8, wherein in response to being notified of the update, the first server process initiates storing the state information.

11. The computing system of claim 8, wherein in response to detecting the update, the second server process initiates sending the request for the state information.

12. A method performed by a computing system comprising:
    storing in a storage system memory of the computing system, by an operating system of at least one server computing device of the computing system, state information associated with a first server process executing within at least one server computing device of the computing system, the state information describing resources of the computing system used by the first server process for executing a process or program by the first server process requested by at least one client computing device, wherein the storage system memory is operatively coupled to the at least one server computing device;
    executing, by the first server process, the process or program requested by the at least one client computing device using the resources;
    after the first server process has terminated, receiving, by the operating system, a request for the state information from a second server process executing on the at least one server computing device that replaces the first process;
    after receiving the request, transferring, by the operating system, ownership of the state information stored in the storage system memory to the second server process, the ownership enabling the second server process to use the state information to continue execution of the process or program requested by the at least one client computing device; and
    after completion of the transferring, accessing, by the second server process, the state information stored in the storage system memory, and continue executing, by the second server process, the process or program requested by the at least one client device using the resources described by the state information.

13. The method of claim 12 wherein transferring ownership comprises the operating system notifying a spawner of the first server process that the second server process requested the stored state information.

14. The method of claim 13, further comprising transmitting, by the spawner of the first server process, a first verification code to the second server process and comparing, by the operating system, the first verification code provided to the second server process and a second verification code associated with the first server process.

15. The method of claim 12, wherein transferring ownership comprises the operating system receiving one or more capability handles as a portion of the stored processing information.

16. The method of claim 12, further comprising the operating system, in response to receiving notification of an update associated with the first server process, notifying the first server process of the update.

17. The method of claim 16, further comprising the operating system causing spawning of the second server process based on the update.

18. The method of claim 16, wherein in response to being notified of the update, the first server process initiates storing the state information.

19. The method of claim 16, wherein in response to detecting the update, the second server process initiates sending the request for the state information.

* * * * *